US006882997B1

(12) United States Patent
Zhang et al.

(10) Patent No.: US 6,882,997 B1
(45) Date of Patent: Apr. 19, 2005

(54) WAVELET-BASED CLUSTERING METHOD FOR MANAGING SPATIAL DATA IN VERY LARGE DATABASES

(75) Inventors: Aidong Zhang, Getzville, NY (US); Gholamhosein Sheikholeslami, Buffalo, NY (US); Surojit Chatterjee, Mountain View, CA (US)

(73) Assignee: The Research Foundation of SUNY at Buffalo, Amherst, NY (US)

( * ) Notice: Subject to any disclaimer, the term of this patent is extended or adjusted under 35 U.S.C. 154(b) by 233 days.

(21) Appl. No.: 09/645,630

(22) Filed: Aug. 24, 2000

Related U.S. Application Data

(60) Provisional application No. 60/150,731, filed on Aug. 25, 1999.

(51) Int. Cl.$^7$ ............................................. G06F 17/30
(52) U.S. Cl. ................... 707/6; 707/104.1; 707/103 R; 382/225
(58) Field of Search .................... 707/1–10, 101–104.1, 707/103 R; 382/181, 201, 225

(56) References Cited

U.S. PATENT DOCUMENTS

| | | | | |
|---|---|---|---|---|
| 5,465,308 A | * | 11/1995 | Hutcheson et al. | 382/159 |
| 5,647,058 A | * | 7/1997 | Agrawal et al. | 707/1 |
| 5,799,301 A | * | 8/1998 | Castelli et al. | 707/6 |
| 5,825,909 A | * | 10/1998 | Jang | 382/132 |
| 6,003,029 A | * | 12/1999 | Agrawal et al. | 707/7 |
| 6,032,146 A | * | 2/2000 | Chadha et al. | 707/6 |
| 6,105,149 A | * | 8/2000 | Bonissone et al. | 714/26 |
| 6,195,459 B1 | * | 2/2001 | Zhu | 382/176 |

OTHER PUBLICATIONS

Li et al., A Survey on Wavelet Applications in Data Mining, Dec. 2002, SIGKDD Explorations, vol. 4, Issue 2—pp. 49–68.*

W. Wang, J. Yang, R. Muntz. "STING: A Statistical Information Grid Approach to Spatial Data Mining". 1997. In Proceeding of the 23rd VLDB Conference pp. 186–195.*

G. Sheikholeslami and A. Zhang. "An Approach to Clustering Large Visual Databases Using Wavelet Transform". Feb. 1997. In Proceedings of the SPIE Conference on Visual Data Exploration and Analysis IV, pp. 322–333.*

J.R. Smith and S. Chang. Transform Features for Texture Classification and Discrimination in Large Image Databawses. 1994. In Proceeding of the IEEE International Conference on Image Processing. pp. 407–411.*

M Ester, H. Kriegel, J. Sander, and X. Xu. "Clustering for Mining in Large Spatial Databases". 1998. ScienTec Publishing. KI–Journal. Specail Issue on Data Mining.*

Michale L. Hilton, Bjorn D. Jawerth, and Ayan Sengupta. "Compressing Still and Moving Images with Wavelets." Dec. 1994. Multimedia Systems. pp. 218–227.*

(Continued)

*Primary Examiner*—Jean R. Homere
*Assistant Examiner*—Leslie Wong
(74) *Attorney, Agent, or Firm*—Simpson & Simpson, PLLC

(57) ABSTRACT

The method termed WaveCluster for mining spatial data. WaveCluster considers spatial data as a multidimensional signals and applies wavelet transforms, a signal-processing technique, to convert the spatial data into the frequency domain. The wavelet transforms produce a transformed space where natural clusters in the data become more distinguishable. The method quantizes a feature space to determine cells of the feature space, assigns objects to the cells, applies a wavelet transform on the quantized feature space to obtain a transformed feature space, finds connected clusters in sub bands at different levels of the transformed feature space, assigns labels to the cells, creates a look-up table, and maps the objects to the clusters. The method can manage spatial data in a two-dimensional feature space. The method also is applicable to a feature space that is made up of an image taken by a satellite.

3 Claims, 13 Drawing Sheets

A sample 2-dimensional feature space.

OTHER PUBLICATIONS

G. Sheikholeslami. S. Chatterjee, and A. Zhang. "Wave-Cluster. A Multi–Resolution Clustering Approach for Very Large Spatial Databases". Aug. 1998. In Proceedings of the 24th VLDB conference. pp. 428–439.*

D. Allard and C. Fraley. Non parametric maximum likelihood estimation of features in spatial process using voronoi tesselation. Journal of the American Statistical Association, Dec. 1997.

Rakesh Agrawal, Johannes Gehrke, Dimitrios Gunopulos, and Phabhakar Raghavan. Automatic subspace clustering of high dimensional data for data mining applications. In Proceedings of the AGM SIGMOD Conference on Management of Data, pp. 94–105, Seattle, WA, 1998.

S. Byers and A.E. Raftery. Nearest neighbor clutter removal for estimating features in spatial point processes. Technical Report 295, Department of Statistics, University of Washington, 1995.

Special Issue on Content–Based Image Retrieval Systems, Editors V.N. Gudivada and V.V. Raghaven, IEEE Computer, 28(9), 1995.

M.Ester, H. Kriegel, J. Sander, and X.Xu. A Density–Based Algorithm for Discovering Clusters in Large Spatial Databases with Noise. In Proceedings of 2nd International Conference on KDD, 1996.

M. Ester, H. Kriegel, J. Sander, and X. Xu. Clustering for mining in large spatial databases. KI–Journal, 1998. Special Issue on Data Mining, ScienTec Publishing.

A.D. Gordon. Classification Methods for the Exploratory Analysis of Multivariate Data. Chapman and Hall, 1981.

Michael L. Hilton, Bjorn D. Jawerth, and Ayan Sengupta. Compressing Still and Moving Images with Wavelets. Multimedia Systems, 2(5):218–227, Dec. 1994.

Berthold Klaus Paul Horn. Robot Vision. The MIT Press, forth edition, 1988.

Charles E. Jacobs, Adam Finkelstein, and David H. Salesin. Fast multiresolution image querying. In SIGGRAPH 95, Los Angeles, California, Aug. 1995.

Donald E. Knuth. The Art of Computer Programming. Addison–Wessley, third edition, 1998.

S. Mallat. Multiresolution approximation and wavelet orthonormal bases of L®. Transactions of American Mathematical Society, 315:69–87, Sep. 1989.

S. Mallat. A theory for multiresolution signal decomposition: the wavelet representation. IEEE Transactions on Pattern Analysis and Machine Intelligence, 11:674–693, Jul. 1989.

R.T. Ng and J. Han. Efficient and Effective Clustering Methods for Spatial Data Mining. In Proceedings of the 20th VLDB Conference, pp. 144–155, Santiago, Chile, 1994.

D. Nassimi and S. Sahni. Finding connected components and connected ones on a mesh–connected parallel computer. SIAM Journal on Computing, 9:744–757, 1980.

S. Openshaw. A geographical solution to scale and aggregation problems in region–building, partitioning and spatial modelling. Transactions of the Institute of British Geographers, 2:459–472, 1977.

S. Openshaw and P. Taylor. Quantitative Geography: A British View, chapter The Modifiable Areal Unit Problem, pp. 60–69. London: Routledge, 1981.

E.J. Pauwels, P. Fiddelaers, and L. Van Gool. DOG–based unsupervised clustering for CBIR. In Proceedings of the 2nd International Conference on Visual Information Systems, pp. 13–20, San Diego, California, Dec. 1997.

J.R. Smith and S. Chang. Transform Features For Texture Classification and Discrimination in Large Image Databases. In Proceedings of the IEEE International Conference on Image Processing, pp. 407–411, 1994.

Robert Schalkoff. Pattern Recognition: Statistical, Structural and Neural Approaches. John Wiley & Sons, Inc., 1992.

G. Sheikholeslami. S. Chatterjee, and A. Zhang. WaveCluster. A Multi–Resolution Clustering Approach for Very Large Spatial Databases. In Proceedings of the 24th VLDB conference, pp. 428–439, New York City, Aug. 1998.

G. Strang and T. Nguyen. Wavelets and Filter Banks. Wellesley–Cambridge Press, 1996.

Y. Shilaoch and U. Vishkin. An O(logn) parallel connectivity algorithm. Journal of Algorithms, 3:57–67, 1982.

G. Sheikholeslami and A. Zhang. An Approach to Clustering Large Visual Databases Using Wavelet Transform. In Proceedings of the SPIE Conference on Visual Data Exploration and Analysis IV, pp. 322–333, San Jose, Feb. 1997.

G. Sheikholeslami, A. Zhang, and L. Brian. Geographical Data Classification and Retrieval. In Proceedings of the 5th ACM International Workshop on Geographical Information Systems, pp. 58–61, Las Vegas, Nevada, Nov. 1997.

Greet Uytterhoeven, Dirk Roose, and Adhemar Bultheel. Wavelet transforms using lifting scheme. Technical Report ITA–Wavelets Report WP 1.1, Katholieke Universiteit Leuven, Department of Computer Science, Belgium, Apr. 1997.

Wei Wang, Jiong Yang, and Richard Muntz. STING: A Statistical Information Grid Approach to Spatial Data Mining. In Proceedings of the 23rd VLDB Conference, pp. 186–195, Athens, Greece, 1997.

X. Xu, M. Ester, H. Kriegel, and J. Sander. A distribution–based clustering algorithm for mining in large spatial databases. In Proceedings of the 14th International Conference on Data Engineering, pp. 324–331, Orlando, FL, Feb. 1998.

D. Yu, S. Chatterjee, G. Sheikholeslami, and A. Zhang. Efficiently detecting arbitrary shaped clusters in very large datasets with high dimensions. Technical Report 98–8, State University of New York at Buffalo, Department of Computer Science and Engineering, Nov. 1998.

Mohamed Zait and Hammou Messatfa. A comparative study of clustering methods. Future Generation Computer Systems, 13:149–159, Nov. 1997.

Tian Zhang, Raghu Ramakrishnan, and Miron Livny. BIRCH: An Efficient Data Clustering Method for Very Large Databases. In Proceedings of the 1996 ACM SIGMOD International Conference on Management of Data, pp. 103–114.

* cited by examiner

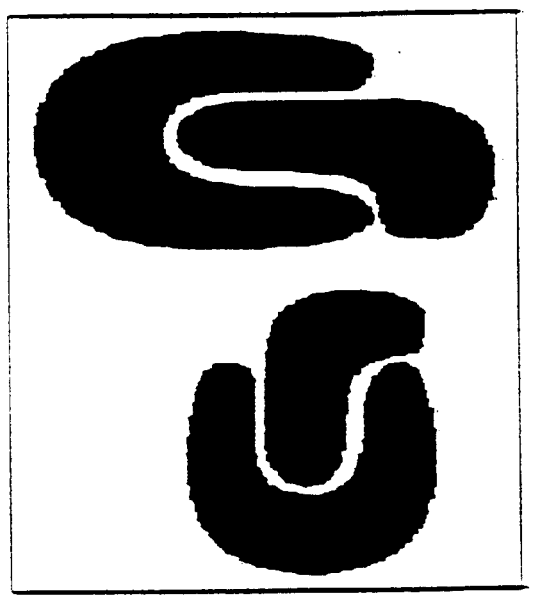
Figure 1: A sample 2-dimensional feature space.

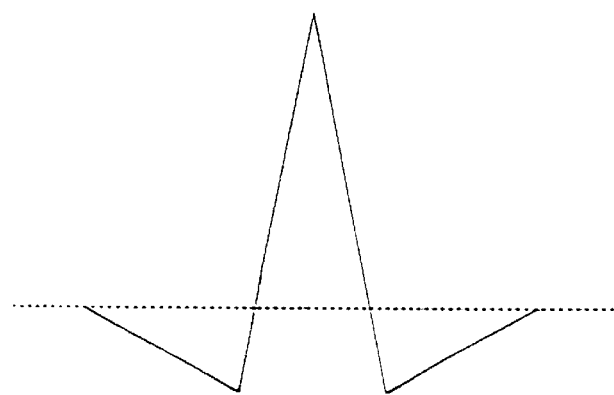
Figure 2: Cohen-Daubechies-Feauveau (2.2) biorthogonal wavelet.

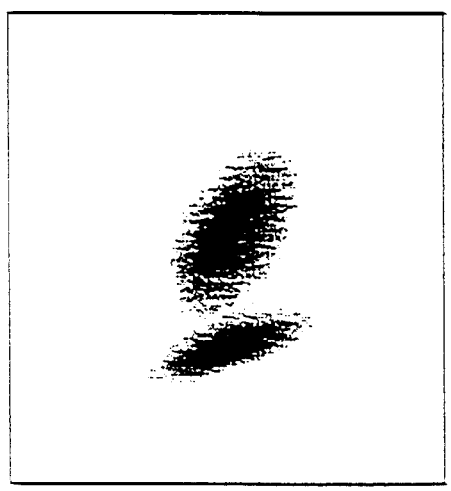 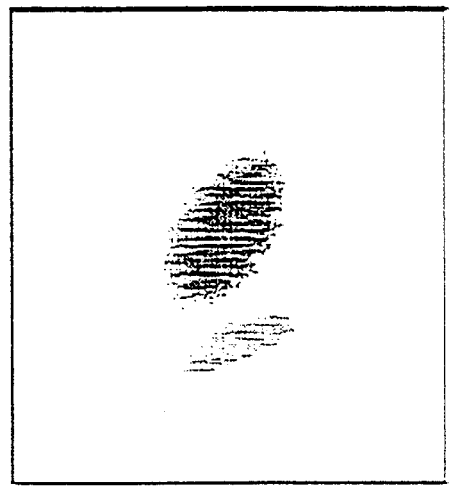
a)  b)
Figure 3: a) Original feature space; b) Transformed space

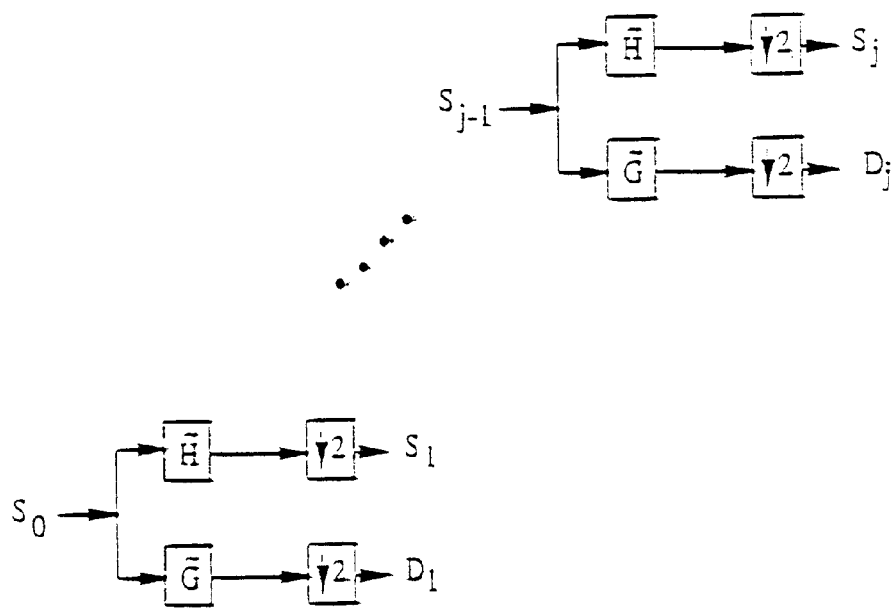
Figure 4: Block diagram of multi-resolution wavelet transform.

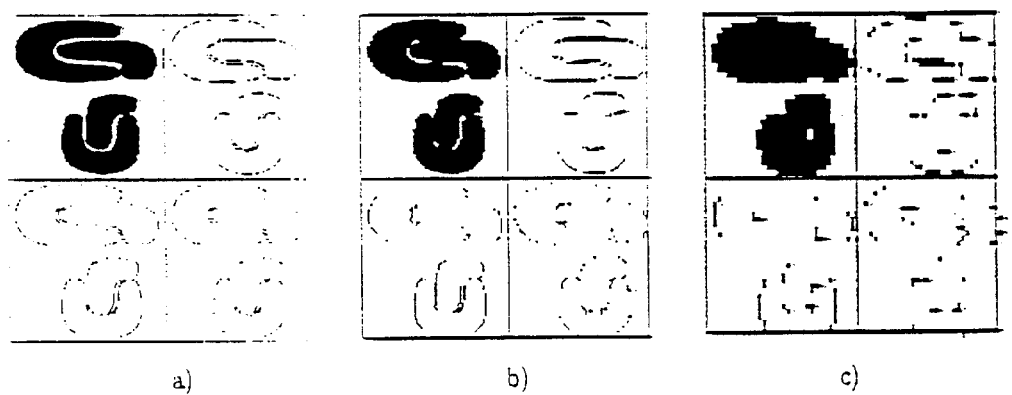
Figure 5: Multi-resolution wavelet representation of the feature space in Figure 1 at a) scale 1; b) scale 2; c) scale 3.

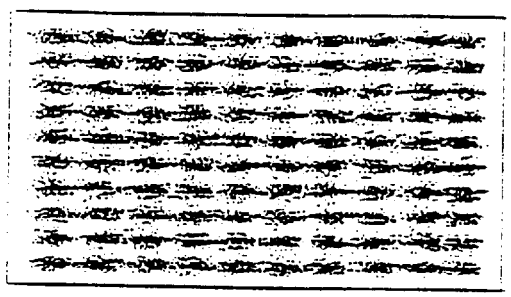
a) DS1
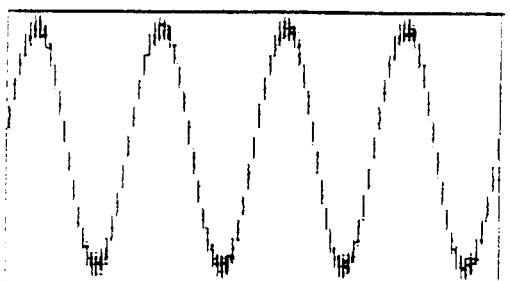
b) DS2
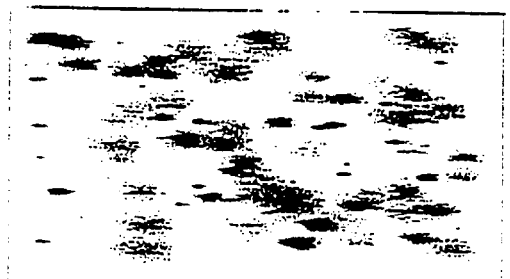
c) DS3
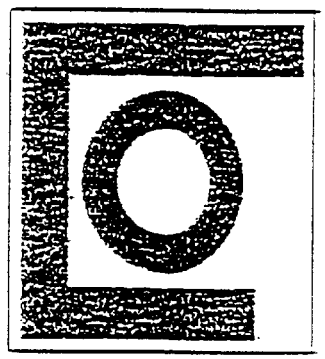
d) DS4
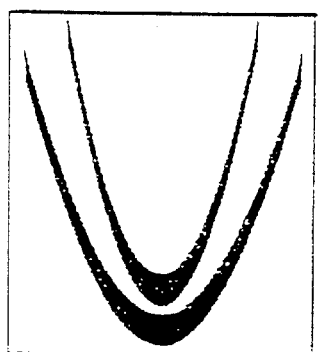
e) DS5
f) DS6
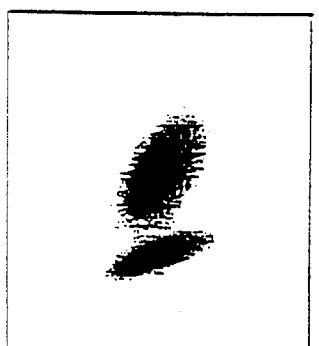
g) DS7
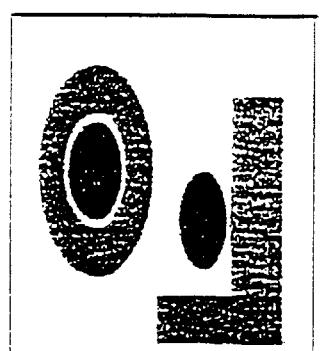
h) DS8
Figure 6: Visualization of some of the datasets used in the experiments.

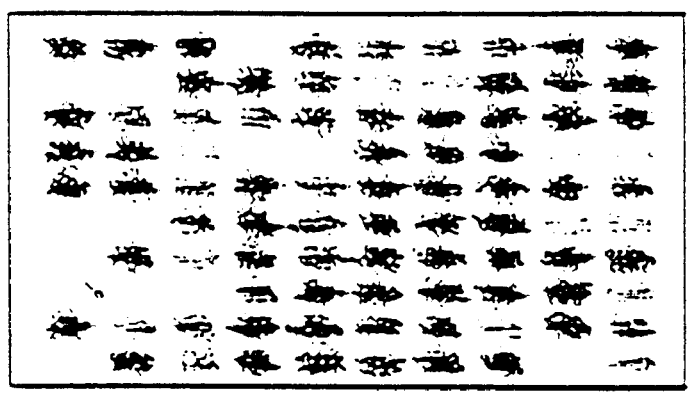
Figure 7: WaveCluster on DS1.

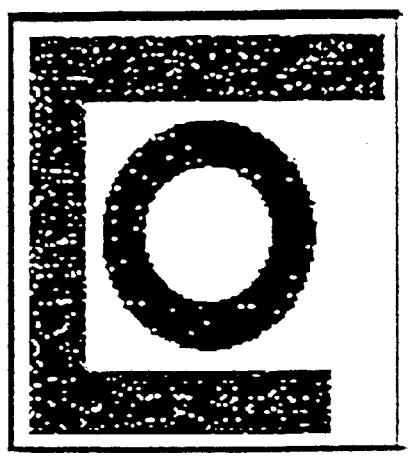 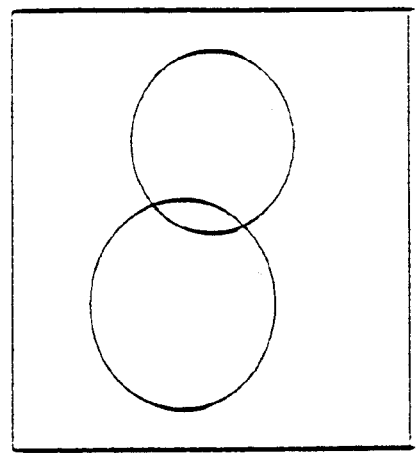
Figure 8: Clustering results on DS4: a) WaveCluster, b) BIRCH.

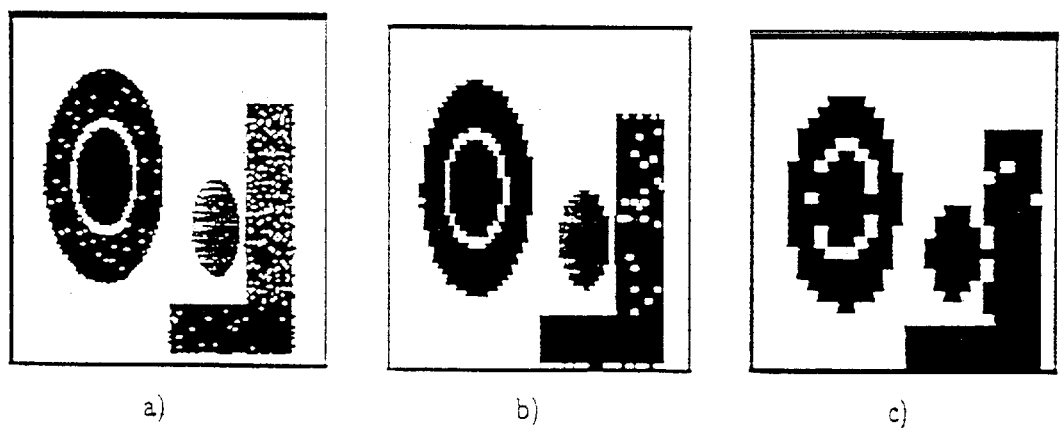
Figure 9: WaveCluster output clusters of DS8 at a) scale 1; b) scale 2; c) scale 3.

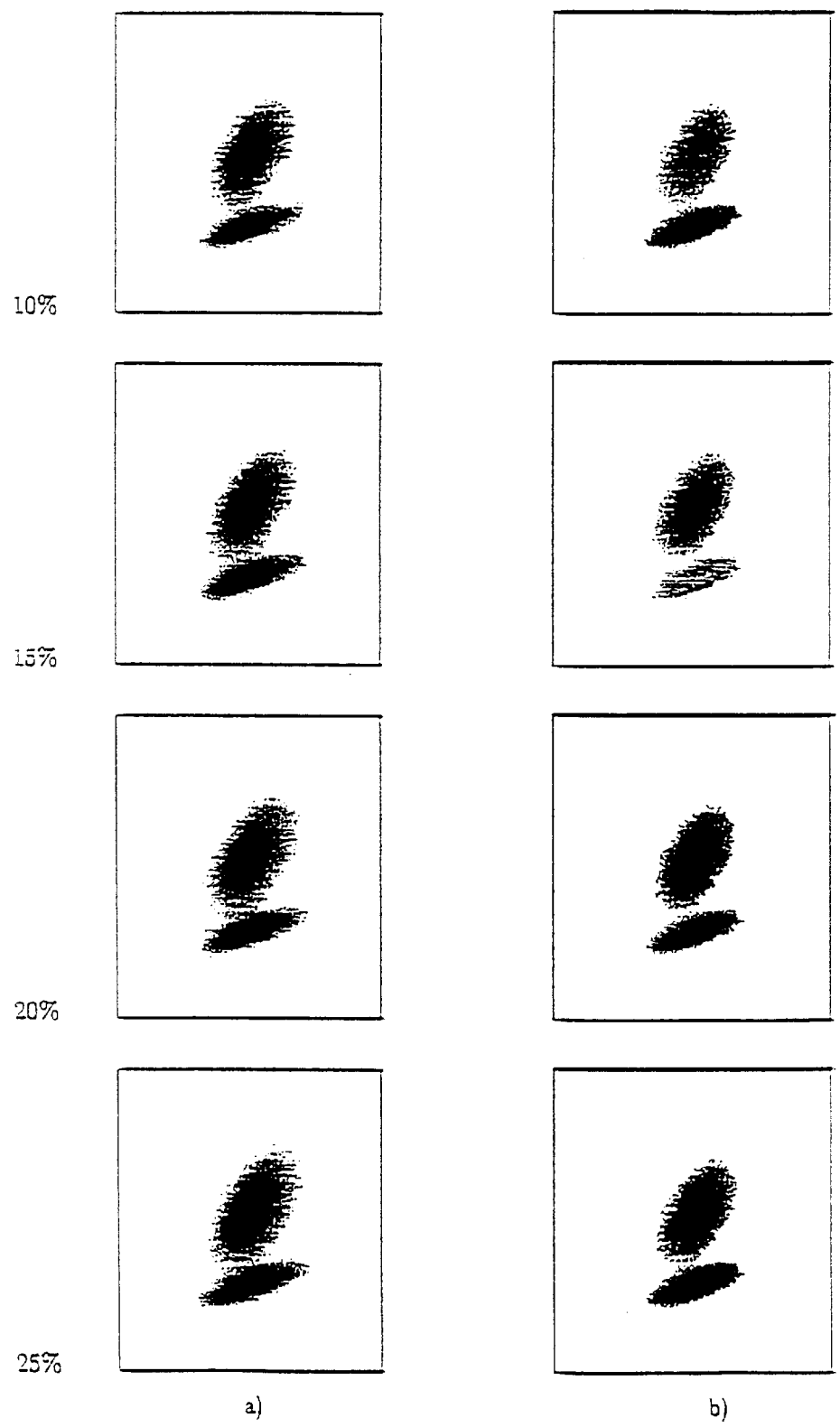
Figure 10: WaveCluster on datasets with different levels of noise: a) Noisy datasets; b) Clusters.

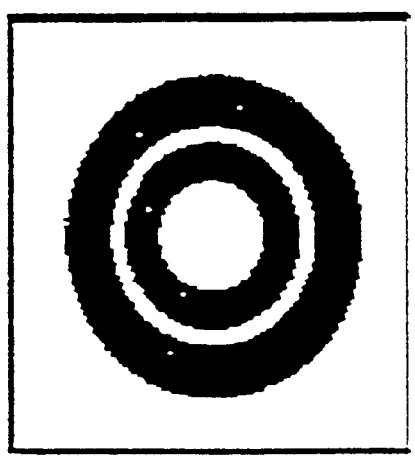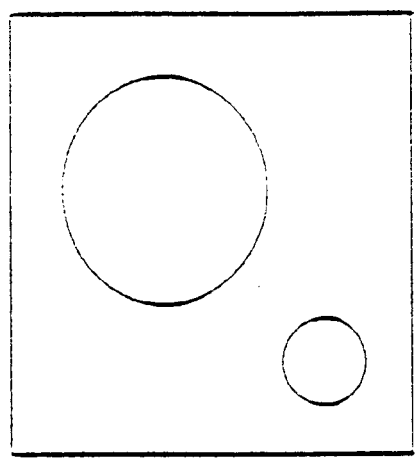
Figure 11: a) WaveCluster on DS6; b) BIRCH on DS6.

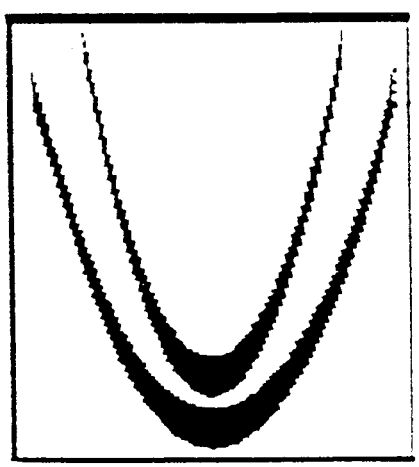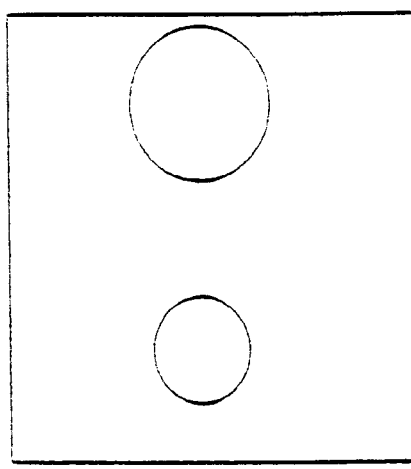
Figure 12: a) WaveCluster on DS5; b) BIRCH on DS5.

WAVELET-BASED CLUSTERING METHOD FOR MANAGING SPATIAL DATA IN VERY LARGE DATABASES

PRIORITY CLAIM

This nonprovisional patent application claims the benefit under 35 U.S.C. §119(e) of U.S. Provisional Patent Application No. 60/150,731 filed on Aug. 25, 1999.

FIELD OF THE INVENTION

The present invention relates generally to the management of data in databases, especially spatial data in very large databases and, more particularly, to a wavelet-based method of managing spatial data in very large databases.

BACKGROUND OF THE INVENTION

The visual content in an image may be represented by a set of features such as texture, color and shape. In a database, the features of an image can be represented by a set of numerical numbers, termed a feature vector. Various dimensions of feature vectors are used for content-based retrieval. In this patent, the term "spatial data" refers to those data that are two-dimensional (2D) and three-dimensional (3D) points, polygons, and points in some d-dimensional feature space. In this patent, we disclose a novel data clustering method in the spatial data-mining problem.

Spatial data mining is the discovery of characteristics and patterns (hopefully interesting characteristics and patterns) that may exist in large spatial databases. Usually the spatial relationships are implicit in nature. Because of the huge amounts of spatial data that may be obtained from satellite images, medical equipment, Geographic Information Systems (GIS), image database exploration etc., it is expensive and unrealistic for the users to examine spatial data in detail. Spatial data mining aims to automate the process of understanding spatial data by representing the data in a concise manner and reorganizing spatial databases to accommodate data semantics. It can be used in many applications such as seismology (grouping earthquakes clustered along seismic faults), minefield detection (grouping mines in a minefield), and astronomy (grouping stars in galaxies), among a myriad of other applications.

The aim of data clustering methods is to group the objects in spatial databases into meaningful subclasses. Due to the huge amount of spatial data, an important challenge for clustering algorithms is to achieve good time-efficiency. Also, due to the diverse nature and characteristics of the sources of the spatial data, the clusters may be of arbitrary shapes. They may be nested within one another, may have holes inside, or may possess concave shapes. A good clustering algorithm should be able to identify clusters irrespective of their shapes or relative positions. Another important issue is the handling of noise. Noise objects (outliers) refer to the objects that are not contained in any cluster and should be discarded during the mining process. The results of a good clustering approach should not be affected by the different ordering of input data and should produce the same clusters. In other words, the results should be order insensitive with respect to input data.

The complexity and enormous amount of spatial data may hinder the user from obtaining any knowledge about the number of clusters present. Thus, clustering algorithms should not assume to have the input of the number of clusters present in the spatial domain. To provide the user maximum effectiveness, clustering algorithms should classify spatial data at different levels of detail. For example, in an image database, the user may pose queries like whether a particular image is of type agricultural or residential. Suppose the system identifies that the image is of agricultural category and the user may be just satisfied with this broad classification. Again, the user may inquire about the actual type of the crop that the image shows. This requires clustering at hierarchical levels of coarseness which we call the multi-resolution property.

In the description of the present invention which follows, we cite to the following references:

[AF97] D. Allard and C. Fraley. Non parametric maximum likelihood estimation of features in spatial process using voronoi tesselation. *Journal of the American Statistical Association*, December 1997.

[AGGR98] Rakesh Agrawal, Johannes Gehrke, Dimitrios Gunopulos, and Prabhakar Raghavan. Automatic subspace clustering of high dimensional data for data mining applications. In *Proceedings of the AGM SIGMOD Conference on Management of Data*, pages 94–105, Seattle, Wash., 1998.

[BR95] S. Byers and A. E. Raftery. Nearest neighbor clutter removal for estimating features in spatial point processes. Technical Report 295, Department of Statistics, University of Washington, 1995.

[COM95] Special Issue on Content-Based Image Retrieval Systems, Editors V. N. Gudivada and V. V. Raghaven, *IEEE Computer*, 28(9), 1995.

[EKSX95] M. Ester, H. Kriegel, J. Sander, and X. Xu. A Density-Based Algorithm for Discovering Clusters in Large Spatial Databases with Noise. In *Proceedings of $2^{nd}$ International Conference on KDD*, 1996.

[EKSX98] M. Ester, H. Kriegel, J. Sander, and X. Xu. Clustering for mining in large spatial databases. *KI-Journal*, 1998. Special Issue on Data Mining, Scien-Tec Publishing.

[Gor81] A. D. Gordon. *Classification Methods for the Exploratory Analysis of Multivariate Data*. Chapman and Hall, 1981.

[HJS94] Michael L. Hilton, Bjorn D. Jawerth, and Ayan Sengupta. Compressing Still and Moving Images with Wavelets. *Multimedia Systems*, 2(5):218–227, December 1994.

[Hor88] Berthold Klaus Paul Horn. *Robot Vision*. The MIT Press, forth edition, 1988.

[JFS95] Charles E. Jacobs, Adam Finkelstein, and David H. Salesin. Fast multiresolution image querying. In *SIGGRAPH 95*, Los Angeles, Calif., August 1995.

[JM95] R. Jain and S. N. J. Murthy, Similarity Measures for Image Databases. In *Proceedings of the SPIE Conference on Storage and Retrieval of Image and Video Databases III*, pages 58–67, 1995.

[Knu98] Donald E. Knuth. *The Art of Computer Programming*. Addison-Wessley, third edition, 1998.

[KR90] L. Kaufman and P. J. Rousseeuw. *Finding Groups in Data: an Introduction to Cluster Analysis*. John Wiley & Sons, 1990.

[Mal89a] S. Mallat. Multiresolution approximation and wavelet orthonormal bases of $L^2$ ®. *Transactions of American Mathematical Society*, 315:69–87, September 1989.

[Mal89b] S. Mallat. A theory for multiresolution signal decomposition: the wavelet representation. *IEEE Transactions on Pattern Analysis and Machine Intelligence*, 11:674–693, July 1989.

[NH94] R. T. Ng and J. Han. Efficient and Effective Clustering Methods for Spatial Data Mining. In *Proceedings of the $20^{th}$ VLDB Conference*, pages 144–155, Santiago, Chile, 1994.

[NS80] D. Nassimi and S. Sahni. Finding connected components and connected ones on a mesh-connected parallel computer. *SIAM Journal on Computing*, 9:744–757, 1980.

[Ope77] S. Openshaw. A geographical solution to scale and aggregation problems in region-building, partitioning and spatial modelling. *Transactions of the Institute of British Geographers*, 2:459–472, 1977.

[OT81] S. Openshaw and P. Taylor. *Quantitive Geography: A British View*, chapter The Modifiable Areal Unit Problem, pages 60–69. London: Routledge, 1981.

[PFG97] E. J. Pauwels, P. Fiddelaers, and L. Van Gool. DOG-based unsupervised clustering for CBIR. In *Proceedings of the $2^{nd}$ International Conference on Visual Information Systems*, pages 13–20, San Diego, Calif., December 1997.

[SC94] J. R. Smith and S. Chang. Transform Features For Texture Classification and Discrimination in Large Image Databases. In *Proceedings of the IEEE International Conference on Image Processing*, pages 407–411, 1994.

[Sch92] Robert Schalkoff. *Pattern Recognition: Statistical, Structural and Neural Approaches*. John Wiley & Sons, Inc., 1992.

[SCZ98] G. Sheikholeslami. S. Chatterjee, and A. Zhang. WaveCluster. A Multi-Resolution Clustering Approach for Very Large Spatial Databases. In *Proceedings of the $24^{th}$ VLDB conference*, pages 428–439, New York City, August 1998.

[SN96] G. Strang and T. Nguyen. *Wavelets and Filter Banks*. Wellesley-Cambridge Press, 1996.

[SV82] Y. Shilaoch and U. Vishkin. An O(logn) parallel connectivity algorithm. *Journal of Algorithms*, 3:57–67, 1982.

[SZ97] G. Sheikholeslami and A. Zhang. An Approach to Clustering Large Visual Databases Using Wavelet Transform. In *Proceedings of the SPIE Conference on Visual Data Exploration and Analysis IV*, pages 322–333, San Jose, February 1997.

[SZB97] G. Sheikholeslami, A. Zhang, and L. Brian. Geographical Data Classification and Retrieval. In *Proceedings of the $5^{th}$ ACM International Workshop on Geographical Information Systems*, pages 58–61, Las Vegas, Nev., November 1997.

[URB97] Greet Uytterhoeven, Dirk Roose, and Adhemar Bultheel. Wavelet transforms using lifting scheme. Technical Report ITA-Wavelets Report WP 1.1, Katholieke Universiteit Leuven, Department of Computer Science, Belgium, April 1997.

[Vai93] P. P. Vaidyanathan. *Multirate Systems and Filter Banks*. Prentice Hall Signal Processing Series. Prentice Hall, Englewood Cliffs, N.J., 1993.

[WYM97] Wei Wang, Jiong Yang, and Richard Muntz. STING: A Statistical Information Grid Approach to Spatial Data Mining. In *Proceedings of the $23^{rd}$ VLDB Conference*, pages 186–195, Athens, Greece, 1997.

{XMKS98} X. Xu, M. Ester, H. Kriegel, and J. Sander. A distribution-based clustering algorithm for mining in large spatial databases. In *Proceedings of the $14^{th}$ International Conference on Data Engineering*, pages 324–331, Orlando, Fla., February 1998.

[YCSZ98] D. Yu, S. Chattetjee, G. Sheikholeslami, and A. Zhang. Efficiently detecting arbitrary shaped clusters in very large datasets with high dimensions. Technical Report 98-8, State University of New York at Buffalo, Department of Computer Science and Engineering, November 1998.

[ZM97] Mohamed Zait and Hammou Messatfa. A comparative study of clustering methods. *Future Generation Computer Systems*, 13:149–159, November 1997.

[ZRL96] Tian Zhang, Raghu Ramakrishnan, and Miron Livny. BIRCH: An Efficient Data Clustering Method for Very Large Databases. *In Proceedings of the 1996 ACM SIGMOD International Conference on Management of Data*, pages 103–114, Montreal, Canada, 1996.

Thus, a longfelt need has existed for a wavelet-based method of managing spatial data in very large databases.

SUMMARY OF THE INVENTION

In this patent, we disclose a spatial data mining method, termed WaveCluster. We consider the spatial data as multi-dimensional signals and we apply signal-processing techniques—wavelet transforms to convert the spatial data into the frequency domain. In wavelet transform, convolution with an appropriate kernel function results in a transformed space where the natural clusters in the data become more distinguishable. We then identify the clusters by finding the dense regions in the transformed domain. WaveCluster conforms to all the requirements of good clustering algorithms as discussed above. It can handle any large spatial datasets efficiently. It discovers clusters of any arbitrary shape and successfully handles noise, and it is totally insensitive to the ordering of the input data. Also, because of the signal processing techniques applied, the multi-resolution property is attributed naturally to WaveCluster. To our knowledge, no method currently exists which exploits these properties of wavelet transform in the clustering problem in spatial data mining. It should be noted that use of WaveCluster is not limited only to the spatial data, and it is applicable to any collection of attributes with ordered numerical values.

BRIEF DESCRIPTION OF THE DRAWINGS

FIG. 1 illustrates a sample 2-dimensional feature space;

FIG. 2 illustrates a Cohen-Daubechies-Feauveau (2,2) biorthogonal wavelet,

FIG. 3a illustrates an original feature space;

FIG. 3b illustrates a transformed space;

FIG. 4 is a block diagram of a multi-resolution wavelet transform;

FIGS. 5a, 5b, and 5c illustrate a multi-resolution wavelet representation of the feature space in various scales 1, 2, 3, respectfully;

FIGS. 6a through 6h are visualizations of some of the datasets DS1 through DS8, respectivly, used in the experiments;

FIG. 7 illustrates WaveCluster on DS1;

FIG. 8a illustrates clustering results on DS4;

FIG. 8b illustrates BIRCH clustering results on DS4;

FIGS. 9a, 9b, and 9c illustrate WaveCluster output clusters of DS8 at various scales 1, 2, and 3, respectively;

FIG. 10a illustrates of WaveCluster on datasets with noise levels from 10 percent to 25 percent;

FIG. 10b illustrates clusters resulting from the use of WaveCluster on the noisy datasets shown in FIG. 10a;

FIG. 11a illustrates WaveCluster on DS6;

FIG. 11b illustrates BIRCH on DS6;

FIG. 12a illustrates WaveCluster on DS5; and,

FIG. 12b illustrates BIRCH on DS5.

DETAILED DESCRIPTION OF THE PREFERRED EMBODIMENT

1 Problem Formalization

Figure 13:
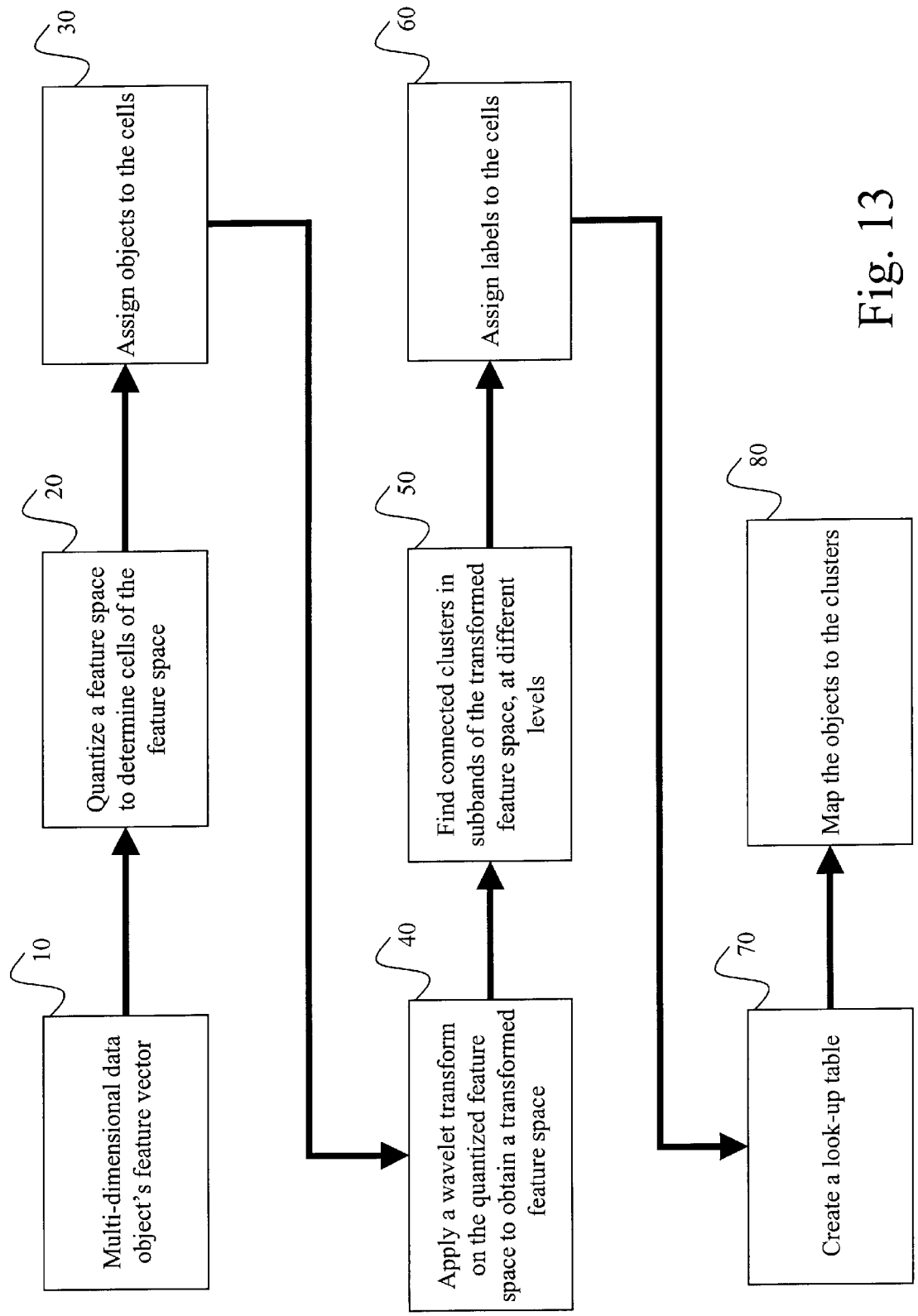
FIG. 13 is a flowchart illustrating a method according to the present invention.

Following the definition of Agrawal et. al. [AGGR98], let $A=A_1, A_2, \ldots, A_d$ be a set of bounded, totally ordered domains and $S=A_1 \times A_2 \times \ldots A_d$ be a d-dimensional numerical space or feature space. $A_1, \ldots, A_d$ are referred as dimensions of S. The input data set is a set of d-dimensional points $O=\{o_1, o_2, \ldots o_N\}$, where $o_i=<o_{i1},o_{i2}, \ldots, o_{id}>1 \leq i \leq N$. The j-th component of $o_i$ is drawn from domain $A_j$.

We first partition the original feature space into nonoverlapping hyper-rectangles which we call cells. The cells are obtained by segmenting every dimension A, into m, number of intervals. Each cell $c_i$ is the intersection of one interval from each dimension. It has the form $<c_{i1},c_{i2},\ldots,c_{id}>$ where $c_{ij}=[l_{ij}, h_{ij})$ is the right open interval in the partitioning of $A_j$. Each cell $c_i$ has a list of statistical parameters ci.param associated with it.

We say that a point $o_k=<o_{k1}, \ldots, o_{kd}>$ is contained in a cell $c_i$, if $l_{ij} \leq o_{ki} < h_{ij}$ for $1 \leq j < d$. The list $c_i$.param keeps track of the statistical properties such as aggregation, mean, variance, and the probability distribution of the data points contained in the cell $c_i$. In general, in grid-based approaches by a single pass through the dataset the containment relations are discovered and appropriate statistical parameters are computed. Each cell has information about the density of the data contained in the cell. Thus, the collection of ci param summarizes the dataset.

We choose the number of points contained in each cell as the only statistic to be used. That is, we use $c_i$.count to be the $c_i$.parameter. In our approach we apply wavelet transform on $c_i$.count values. We define the transformed space as the set of cells after wavelet transformation on the count values of cells in the quantized space.

In our approach we take an all point stand on defining clusters, i.e., we consider that all the points within a cluster are representatives of the cluster. We introduce the following definitions to be used for the rest of the paper.

Definition 1 (Empty cell) A cell in the quantized space with 0 count value is called an empty cell.

Definition 2 (Nonempty cell) A cell in the quantized space with nonzero count value is called a nonempty cell.

Definition 3 (Significant cell) A cell is a significant cell if its count field[1] in the transformed space is above a certain threshold τ.

In case we keep more elaborate information about each cell than we can specify a range of values for each of the parameters of each cell for determining whether it is a significant cell.

Definition 4 (ε-neighbor) A cell $c_1$ is an ε-neighbor of cell $C_2$ if either both are significant cells (in transformed space) or nonempty cells (in quantized space) and $D(c_1, c_2) < \epsilon$ where D is an appropriate distance metric and $\epsilon > 0$.

We can extend the definition of $\epsilon > 0$.

Definition 5 (k-ε-neighbor) A cell $c_1$ is a k-ε-neighbor of a cell $C_2$ if both are significant cells (in transformed space) or both are nonempty cells (in quantized space) and if $c_1$ is one of the k pre-specified ε-neighbors of $c_2$.

Definition 6 (k-connected) Two cells $c_1$ and $c_2$ are k-connected if there is a sequence of cells $p_1, p_2, \ldots, p_j$ such that $p_1=c_1$ and $p_j=c_2$ and $p_{i+1}$ is a k-ε-neighbor of $p_i$, $1 \leq i \leq j$.

Definition 7 (Cluster) A cluster C is a set of significant cells $\{c_1, c_2, \ldots, c_m\}$ which are k-connected in the transformed space.

Given a set of N database points $0=\{o_1, o_2, \ldots, o_N\}$ in the d-dimensional feature space S, our goal is to find the clusters as defined above. After clustering, each cell in the feature space S will have a label indicating the cluster that it belongs to. In this paper, we propose WaveCluster to cluster very large databases with low number of dimensions, that is, we assume that N is very large and d is low.

2 Related Work

We can categorize the clustering algorithms into four main groups: participating algorithms, hierarchical algorithms, density based algorithms and grid based algorithms.

3.1 Partitioning Algorithms

Partitioning algorithms construct a partition of a database of N objects into a set of K clusters. Usually they start with an initial partition and then use an iterative control strategy to optimize an objective function. There are mainly two approaches i) k-means algorithm, where each cluster is represented by the center of gravity of the cluster, ii) k-medoid algorithm, where each cluster is represented by one of the objects of the cluster located near the center.

PAM [KR90] uses a k-medoid method to identify the clusters. PAM selects K objects arbitrarily as medoids and swap with other objects until all K objects qualify as medoids. PAM compares an object with entire data set to find a medoid, thus it has a slow processing time, $O(K(N-K))^2$. CLARA (Clustering LARge Applications) [KR90] draws a sample of data set, applies PAM on the sample, and finds the medoids of the sample.

Ng and Han introduced CLARANS (Clustering Large Applications based on RANdomaized Search) which is an improved k-medoid method [NH94]. This is the first method that introduces clustering techniques into spatial data mining problems and overcomes most of the disadvantages of traditional clustering methods on large data sets. Although CLARANS is faster than PAM, but it is still slow and as mentioned in [WYM97], its computational complexity is $\Omega(KN^2)$. Moreover, because of its randomized approach, for large values of N, quality of results cannot be guaranteed.

In general, k-medoid methods do not present enough spatial information when the cluster structures are complex.

3.2 Hierarchical Algorithms

Hierarchical algorithms create a hierarchical decomposition of the database. The hierarchical decomposition can be represented as a dendrogram [Gor81]. The algorithm iteratively splits the database into smaller subsets until some termination condition is satisfied. Hierarchical algorithms do not need K as an input parameter, which is an obvious advantage over partitioning algorithms. The disadvantage is that the termination condition has to be specified.

BIRCH (Balanced Iterative Reducing and Clustering using Hierarchies) [ZRL96] uses a hierarchical data structure called CF-tree for incrementally and dynamically clustering the incoming data points. CF-tree is a height balanced tree which stores the clustering features. BIRCH tries to produce the best clusters with the available resources. They consider that the amount of available memory is limited (typically much smaller than the data set size) and want to minimize the time required for I/O. In BIRCH, a single scan of the dataset yields a good clustering, and one or more additional passes can (optionally) be used to improve the quality further. So, the computational complexity of BIRCH is O(N). BIRCH is also the first clustering algorithm to handle noise [ZRL96]. Since each node in CF-tree can only hold a limited number of entries due to its size, it does not always correspond to a natural cluster [ZRL96]. Moreover, for different orders of the same input data, it may generate different clusters. In other words, it is order-sensitive. In addition, as our experimental results showed, if the clusters are "spherical" or convex in shape, BIRCH performs well, however, for other shapes it does not do as well. This is because it uses the notion of radius or diameter to control the boundary of a cluster.

3.3 Density Based Algorithms

Pauwels et al. proposed an unsupervised clustering algorithm to locate clusters by constructing a density function that reflects the spatial distribution of the data points [PFG97]. They modified non-parametric density estimation problem in two ways. Firstly, they use cross-validation to select the appropriate width of convolution kernel. Secondly, they use Difference-of-Gaussians (DOG's) that allows for better clustering and frees the need to choose an arbitrary cut-off threshold. Their method can find arbitrary shape clusters and does not make any assumptions about the underlying data distribution. They have successfully applied the algorithm to color segmentation problems. This method is computationally very expensive {PFG97}. So it can make the method impractical for very large databases.

Ester et al. presented a clustering algorithm DBSCAN relying on a density-based notion of clusters. It is designed to discover clusters of arbitrary shapes [EKSX96]. The key idea in DBSCAN is that for each point of a cluster, the neighborhood of a given radius has to contain at least a minimum number of points, i.e. the density in the neighborhood has to exceed some threshold. DBSCAN can separate the noise (outliers) and discover clusters of arbitrary shape. It uses R*-tree to achieve better performance. But the average run time complexity of DBSCAN is O(NlogN).

3.4 Grid-Based Algorithms

Recently a number of algorithms have been presented which quantize the space into a finite number of cells and then do all operations on the quantized space. The main characteristic of these approaches is their fast processing time which is typically independent of the number of data projects. They depend only on the number of cells in each dimension in the quantized space.

Wang et al. proposed a STatistical INformation Grid-based method (STING) for spatial data mining [WYM97]. They divide the spatial area into rectangular cells using a hierarchical structure. They store the statistical parameters (such as mean, variance, minimum, maximum, and type of distribution) of each numerical feature of the objects within cells. STING goes through the data set once to compute the statistical parameters of the cells, hence the time complexity of generating clusters is O(N). The other previously mentioned clustering approaches do not explain if (or how) the clustering information is used to search for queries, or how a new object is assigned to the clusters. In STING, the hierarchical representation of grid cells is used to process such cases. After generating the hierarchical structure, the response time for a query would be O(K), where K is the number of grid cells at the lowest level [WYM97]. Usually K<<N. which makes this method fast. However, in their hierarchy, they do not consider the spatial relationship between the children and their neighboring cells to construct the parent cell. This might be the reason for the isothetic shape of resulting clusters, that is, all the cluster boundaries are either horizontal or vertical, and no diagonal boundary is detected. It lowers the quality and accuracy of clusters, despite the fast processing time of this approach.

Xu et al. proposed DBCLASD (Distribution Based Clustering of LArge Spatial Databases) [XMKS98]. DBCLASD assumes that the points inside a cluster are uniformly distributed. For each point in the cluster the nearest point which is not inside the cluster is found out. Then it defines nearest neighbor distance set as the set of all distances between each point in the cluster and its nearest point outside the cluster. Then it defines a cluster to be a nearest neighbor distance set that has the expected distribution with a required confidence level. DBCLASD incrementally augments an initial cluster by its neighboring points as long as the nearest neighbor distance set of the resulting cluster still fits the expected distribution. DBCLASD is able to find arbitrary shaped clusters. Furthermore, DBCLASD does not require input parameters to do the clustering. The experimental results presented by Xu et al. shows that it is slower than DBSCAN which has the complexity of O(NlogN). Also, it assumes that points inside a cluster are uniformly distributed which may not be the case in many applications.

In this patent, we disclose WaveCluster, which is a grid-based approach. The proposed approach is very efficient, especially for very large databases. The computational complexity of detecting clusters in our method is O(N). The results are not affected by noise and the method is not sensitive to the order of input objects to be processed. WaveCluster is very capable of finding arbitrary shape clusters with complex structures such as concave or nested clusters at different scales, and does not assume any specific shape for the clusters. A-priori knowledge about the exact number of clusters is not required in WaveCluster. However, an estimation of expected number of clusters helps in choosing the appropriate resolution of clusters.

4 Relating Spatial Data To Multidimensional Signals

In this section, we discuss the relationship between spatial data and multidimensional signals and show how to use wavelet transforms to illustrate the inherent relationships in spatial data.

4.1 Spatial Data versus Multidimensional Signals

The primary motivation for applying signal processing primitives to spatial databases comes from the observation that the multidimensional spatial data objects can be represented in a d-dimensional feature space. The numerical attributes of a spatial object can be represented by a feature vector where each element of the vector corresponds to one numerical attribute, or feature. These feature vectors of the spatial data can be represented in the spatial area, which is termed feature space, where each dimension of the feature space corresponds to one of the features (numerical attributes). For an object with d numerical attributes, the feature vector will be one point in the d-dimensional feature space. The feature space is usually not uniformly occupied by the feature vectors. Clustering the data identifies the sparse and the dense places, and hence discovers the overall distribution of patterns of the feature vectors.

4.2 Wavelet-Based Clustering

We propose to look at the feature space from a signal processing prospective. The collection of objects in the feature space composes a d-dimensional signal. The high frequency parts of the signal correspond to the regions of the feature space where there is a rapid change in the distribution of objects, that is the boundaries of clusters. The low frequency parts of the d-dimensional signal which have high amplitude correspond to the areas of the feature space where the objects are concentrated, in other words the clusters themselves. For example, FIG. 1 shows a 2-dimensional feature space, where the two dimensional data points have formed four clusters. Note that FIG. 1 and also the figures in Section 5 are the visualizations of the 2-dimensional feature spaces and each point in the images represents the feature values of one object in the spatial datasets. Each row or column can be considered as a one-dimensional signal, so the whole feature space will be a 2-dimensional signal. Boundaries and edges of the clusters constitute the high frequency parts of this 2-dimensional signal, whereas the clusters themselves, correspond to the parts of the signal which have low frequency with high amplitude. When the number of objects is high, we can apply signal processing techniques to find the high frequency and low frequency parts of d-dimensional signal representing the feature space, resulting in detecting the clusters.

Wavelet transform is a signal processing technique that decomposes a signal into different frequency subbands (for example, high frequency subband and low frequency subband). The wavelet model can be generalized to d-dimensional signals in which one-dimensional transform can be applied multiple times. Methods have been used to compress data [HJS94], or to extract features from signals (images) using wavelet transform [SC94, JFS95, SZ97, SZB97]. For each object, the extracted features form a feature vector that can be represented by a point in the d-dimensional feature space. A spatial database will be the collection of such points. Wavelet transform has been applied on the objects to generate the feature vectors (feature space). The key idea in our proposed approach is to apply wavelet transform on the feature space (instead of the objects themselves) to find the dense regions in the feature space, which are the clusters. The next subsection discusses the strategy and motivation of using wavelet transform on d-dimensional feature spaces.

4.3 Applying Wavelet transform

Wavelet transform is a type of signal representation that can give the frequency content of the signal at a particular instant of time by filtering. A one-dimensional signal s can be filtered by convolving the filter coefficients $c_k$ with the signal values:

$$\hat{s}_i \equiv \sum_{k=1}^{m} c_k s_{i+k-\frac{M}{2}},$$

where M is the number of coefficients in the filter and $\hat{s}$ is the result of convolution [HJS94]. Wavelet transform provides us with a set of attractive filters. For example, FIG. 2 shows the Cohen-Daubechies-Feauveau (2,2) biorthogonal wavelet.

The motivation for using wavelet transform and thereby finding connected components in the transformed space is drawn from the following observations.

Unsupervised Clustering: The hat-shape filters emphasize regions where points cluster, but simultaneously tend to suppress weaker information in their boundary. Intuitively, dense regions in the original feature space act as attractors for the nearby points and at the time as inhibitors for the points that are not close enough. This means clusters in the data automatically stand out and clear regions around them, so that they become more distinct [PFG97]. It makes finding the connected components in the transformed space easier than that of the original space, because the dense regions in the feature space will be more salient. FIG. 3 shows an example of a feature space before and after transform. In this case we have used Cohen-Daubechies-Feauveau(2,2) biorthogonal transform. Two cluster centers were first placed in a 2-dimensional feature space and then 500,000 points were generated around them following bivariate normal distribution. Then 25,000 uniformly distributed random noise points were added to the data to check the effect of applying wavelet transform on them. As the figure shows, the clusters in the transformed space are more salient and thus easier to be found.

Effective Removal of Noise Objects:

Noise objects are the objects that do not belong to any of the clusters and usually their presence causes problems for the current clustering methods. Applying wavelet transform removes the noise in the original feature space, resulting in more accurate clusters. As we will show, we take advantage of low-pass filters used in the wavelet transform to automatically remove the noise. FIG. 3 shows that a majority of the noise objects in the original space are removed after the transformation.

Multi-resolution:

Multi-resolution property of wavelet transform can help detecting the clusters at different levels of detail. As it will be shown later, wavelet transform provides multiple levels of decompositions which results in clusters at different scales from fine to coarse. The appropriate scale for choosing clusters can be decided based on the user's needs.

Cost Efficiency:

Since applying wavelet transform is very fast, it makes our approach cost-effective. As it will be shown in the experiments, clustering very large datasets takes only a few seconds. Using parallel processing we can get even faster responses.

Applying wavelet transform on a signal decomposes it into different frequency sub-bands Mal89a]. We now briefly review wavelet-based multi-resolution decomposition. More details can be found in Mallat's paper [Mal89b]. To have multi-resolution representation of signals we can use discrete wavelet transform. We can compute a coarser approximation of the one-dimensional input signal $S_0$ by convolving it with the low pass filter H and down sampling the signal by two [Mal89b]. By down sampling, we mean skipping every other signal sample (For example one row in a 2-dimensional feature space). All the discrete approximations $S_j$, $1<j<J$ (J is the maximum possible scale), can thus be computed from $S_0$ by repeating this process. Resolution becomes coarser with increasing j. For example, the third approximation of $S_0$ (that is $S_3$) is coarser than the second approximation $S_2$. FIG. 4 illustrates the method.

We can extract the difference of information between the approximation of signal at scale j−1 and j. $D_j$ denotes this difference of information and is called detail signal at the scale j. We can compute the detail signal $D_j$ by convolving $S_{j-1}$ with the high pass filter $\tilde{G}$ and returning every other sample of output. The wavelet representation of a discrete signal $S_0$ can therefore be computed by successively decomposing $S_j$ into $S_{j+1}$ and $D_{j+1}$ for $0 \leq j <J$. This representation provides information about signal approximation and detail signals at different scales.

We can easily generalize the wavelet model to 2-dimensional feature space, in which we can apply two separate one-dimensional transforms [HJS94]. We can represent a 2-dimensional feature space as an image where each pixel of image corresponds to one cell in the feature space. The 2-dimensional feature space (image) is first convolved along the horizontal (x) dimension, resulting in a lowpass image L and a highpass image H. We then down sample each of the convolved images in the x dimension by 2. Both L and H are then convolved along the vertical (y) dimension, resulting in four subimages: LL, LH, HL, and HH. Once again, we down sample the subimages by 2, this time along the y dimension. The two-dimensional convolution decomposes an image into an average signal (LL) and three detail signals which are directionally sensitive: LH emphasizes the horizontal image features, HL the vertical features, and, HH the diagonal features.

FIGS. 5a, 5b, and 5c illustrate a multi-resolution wavelet representation of the feature space in scales 1, 2, and 3, respectively. At each level, sub-band LL (wavelet approximation of original image) is shown in the upper left quadrant. Sub-band LH (horizontal edges) is shown in the upper right quadrant, sub-bank HL (vertical edges) is displayed in the lower left quadrant, and sub-band HH (corners) is in the lower right quadrant.

The above wavelet model can similarly be generalized for d-dimensional feature space, where one-dimensional wavelet transform will be applied d times. As mentioned earlier, we apply wavelet transform on the feature vectors of objects. At different scales, it decomposes the original feature space into an approximation, or average subband (feature space), which has information about content of clusters, and detail subbands (feature spaces) which have information about boundaries of clusters. The next section describes how we use this information to detect the clusters.

5 WaveCluster

In this section, we introduce our proposed algorithm and discuss its properties. The time complexity analysis of the algorithm is then presented.

5.1 Algorithm

Given a set of spatial objects $o_i$, $1 \leq i \leq N$, the goal of the algorithm is to detect clusters and assign labels to the objects based on the cluster that they belong to. The main idea in WaveCluster is to transform the original feature space by applying wavelet transform and then find the dense regions in the new space. It yields sets of clusters at different resolutions and scales, which can be chosen based on user's needs. The main steps of WaveCluster are shown in Algorithm 1.

FIG. 13 is a flowchart illustrating a method according to the present invention. Step 10 inputs feature vectors for multidimensional data objects. Step 20 quantizes a feature space to determine cells of the feature space. Step 30 assigns objects to the cells. Step 40 applies a wavelet transform on the quantized feature space to obtain a transformed feature space. Step 50 finds connected clusters in subbands of the transformed feature space, at different levels. Step 60 assigns labels to the cells. Step 70 creates a look-up table. Step 80 maps the objects to the clusters. Details of the method shown in FIG. 13 are provided below.

Input: Multidimensional data objects' feature vectors, Step 10

---

Algorithm 1
Input: Multidimensional data objects' feature vectors
Output: clustered objects 1. Quantize feature space, then assign objects to the cells.
2. Apply wavelet transform on the quantized feature space.
3. Find the connected components (clusters) in the subbands of transformed feature space, at different levels
4. Assign labels to the cells.
5. Make the lookup table.
6. Map the objects to the clusters.

---

5.1.1 Quantization

The first step of WaveCluster algorithm, or Step 20 in FIG. 13, is to quantize the feature space, where each dimension $A_i$ in the d-dimensional feature space will be divided into $m_i$ intervals. If we assume that $m_i$ is equal to m for all the dimensions, there would be $m^d$ cells in the feature space. Then the corresponding cell for the objects will be determined, Step 30, based on their feature values.

$$l_{ij} \leq o_{ki} < h_{ij}, 1 \leq j \leq d.$$

We may recall that $c_{ij}=[l_{ij}, h_{ij})$ is the right open interval in the partitioning of $A_j$. For each cell we count the number of objects contained in it to represent the aggregation of the objects. The number (or size) of these cells and the aggregation information in each cell are important issues that affect the performance of clustering. We discuss these quantization issues in the next section. Because of multi-resolution property of wavelet transform, we consider different cell sizes at different scales of transform.

5.1.2 Transform and Clustering

In the second step, discrete wavelet transform will be applied on the quantized feature space, Step 40 in FIG. 13. Applying wavelet transform on the cells in $\{c_j: 1 \leq j \leq J\}$ results in a new feature space and hence new cells $\{t_k: 1 \leq k \leq K\}$. Given the set of cells $\{t_k: 1 \leq k \leq K\}$, WaveCluster detects the connected components in the transformed feature space, Step 50. Each connected component is a set of cells in $\{t_k: 1 \leq k \leq K\}$ and is considered as a cluster. Corresponding to each resolution r of wavelet transform, there would be a set of clusters $C_r$, where usually at the coarser resolutions, number of clusters is less. In the experiments, we applied each of the three-level wavelet transforms Daubechies, Cohen-Daubechies-Feauveau (4,2) and (2,2)) [Vai93, SN96, URB97]. Average subbands (feature spaces) give approximations of the original feature space at different scales, which help in finding clusters at different levels of details. For example, as shown in FIGS. 5a to 5c for a 2-dimensional feature space, the subbands LL show the clusters at different scales.

We use the algorithm in [Hor88] to find the connected components in the 2-dimensional feature space (image). The same concept can be generalized for higher dimensions. In our implementation we have k=8 and $\epsilon=\sqrt{2}$ for k-$\epsilon$-neighborhood as defined in Section 2. That is, a significant cell a in the transformed feature space is k-$\epsilon$-neighbor of another cell b if a lies within one of the 8 grid cells surrounding cell b. The connected component analysis consists of scanning through the image once to find all the connected components, and then equivalence analysis to relabel the components. This takes care of components with holes and concave shapes. There are many well known algorithms for finding connected components in images and we used the one mentioned in [Hor88] for our purpose. FIG. 9 in Section 5 shows the clusters that WaveCluster found at each scale in different colors.

5.1.3 Label Cells and Make Look Up Table

Each cluster w, w $\in C_r$, will have a cluster number $w_n$. In the fourth step of algorithm, WaveCluster labels the cells in each cluster in the transformed feature space with its cluster number, Step 60. That is, $$\forall \omega \forall t_k, t_k \in \omega \rightarrow l_{t_k} = \omega_n, \omega \in C_r,$$

Where $l_{t_k}$ is the label of the cell $t_k$. The clusters that are found are in the transformed feature space and are based on wavelet coefficients. Thus, they cannot be directly used to define the clusters in the original feature space. WaveCluster makes a lookup table LT to map the cells in the transformed feature space to the cells in the original feature space, Step 70. Each entry in the table specifies the relationship between one cell in the transformed feature space and the corresponding cell(s) of the original feature space. So the label of each cell in the original feature space can be easily determined. Finally, WaveCluster assigns the label of each cell in the feature space to all the objects whose feature vector is in that cell, and thus the clusters are determined, Step 80.

$$\forall \omega \forall c_j, \forall o_i \in c_j, l_{o_i} = \omega_n, \omega \in C_r, 1 \leq i \leq N,$$

Where $l_{o_i}$ is the cluster label of object $o_i$.

5.2 Properties of WaveCluster

When the objects are assigned to the cells of the quantized feature space at step 1 of the algorithm, the final content of the cells is independent of the order in which the objects are presented. The following steps of the algorithm will be performed on these cells. Hence, the algorithm will have the same results for any different order of input data, so it is order insensitive with respect to input objects. As it will be formally and experimentally shown later, the required time for WaveCluster to detect the clusters is linear in terms of the number of input data, and it cannot go below that, because all the data should be at least read. After reading the data, the processing time will be only a function of number of cells in the feature space. Thus, it makes WaveCluster very efficient, especially for very large number of objects WaveCluster will be especially very efficient for the cases where the number of cells m and the number of feature space dimension d are low. Minefield detection and some seismology applications are examples where we have low dimensional (2 dimensions) feature spaces.

All the grid-based approaches for clustering spatial data suffer from the Modifiable Areal Cell Problem (MAUP) first addressed by Openshaw in 1977, and Openshaw and Taylor in 1981 [Ope77, OT81]. The problem occurs in terms of scaling and aggregation. The problem of scaling is in selecting appropriate size and number of cells to represent the spatial data. There are infinitely large of number of ways in which cells may be organized and their size be specified. Aggregation is the problem of summarizing the data contained in each cell. In our case we use a simple accumulative approach where the number of the data points contained in a cell summarizes all information about the cell. But there might be other measures which characterize the data more appropriately. In his paper, Openshaw defines this problem mathematically and discusses some heuristics to solve the problem.

All the present grid-based algorithms suffer from these problems. In general, when the quantization value m is too low (very coarse quantization), more objects will be assigned to the same cell, and there is higher probability for the objects from different clusters to belong to the same cell. We call this case under-quantization problem. This results in merging of the two clusters and mislabeling their objects, thus the quality of clustering decreases. In contrast, if the quantization value m is too high (very fine quantization), each object will be in a separate cell which might be far from the other cells. We call this over-quantization problem. Over-quantization can result in many unnecessary small clusters (that might be later removed as noise) and does not find the real clusters, thus it will also decrease the quality of clustering. Aggregation also plays a role in clustering and it depends on the kind of algorithm used for clustering. In STING each cell maintains a list of statistical attributes like number of objects in the cell, mean of values, standard deviation of values, min, max, type of distribution the values in the cell [WYM97]. In CLIQUE proposed by Agrawal et al., each cell is classified as dense or not based on the count value in each cell [AGGR98]. But none of the methods discusses the problems regarding aggregation.

We submit that, in this context, scaling is an inherent problem in what a human user can call a cluster, in other words, the definition of cluster. As Openshaw and Taylor stated, it seems very unlikely that there will ever be either a purely statistical or mathematical solution for MAUP [OT81]. To have an optimal quantization, application domain information should be incorporated. Openshaw provided a geographical solution to scale and aggregation problems in region-building, partitioning, and spatial modeling [Ope77]. However, as he mentions, although his approach seems to work, and perhaps provides the only real solution to a complicated problem, it has its own weaknesses [OT81]. Quantization is a problem that all grid-based algorithms suffer from. However, while other existing grid-based clustering methods ignore this problem, WaveCluster has the advantage of producing clusters at multiple scales at the same time. This means that the results of WaveCluster implicitly reflect multiple quantizations of the feature space, resulting in multiple sets of clusters that can be selected based on the user's requirements.

We use a heuristic-based approach to experimentally find a good quantization. We start with very small size grid cells (over-quantized feature space) and try to find the clusters. Most likely, no clusters will be found at this step. We then increase the size of cells and find the possible clusters. If no acceptable clusters are found, we repeat the process after enlarging the size of cells. This process is continued until we obtain some acceptable clusters. At this phase, WaveClusters, using multiresolution property of wavelet transform, can provide multiple sets of clusters at different scales. This approach to finding an appropriate quantization will increase the overall time to cluster the database. However, given the appropriate quantization, the required time complexity of WaveCluster will still be O(N). Finding the suitable quantization is a common problem for all grid-based methods and this cost should be considered for all of them.

WaveCluster finds the connected components in the average subband (LL) of the wavelet transformed feature space, as the output clusters. As mentioned in Section 4.3, average subband is constructed by convolving the low pass filter along each dimension and down sampling by two. So a wavelet transformed cell will be affected by the content of cells in the neighborhood covered by the filter. It means that the spatial relationships between neighboring cells will be preserved. The algorithm to find the connected components labels each cell of feature space with respect to the cluster that it belongs to. The label of each cell is determined based on the labels of its neighboring cells [Hor88]. It does not make any assumptions about the shape of connected components and can find convex, concave, or nested connected components. Hence, WaveCluster can detect arbitrary shapes of clusters.

WaveCluster applies wavelet transform on the feature space to generate multiple decomposition levels. Each time we consider a new decomposition level, we ignore some details in the average subband and effectively increase the size of a cell's neighborhood whose spatial relationship is considered. This results in sets of clusters with different degrees of details after each decomposition level of wavelet transform. In other words, we will have multi-resolution clusters at different scales, from fine to coarse. For example, in Section 6, FIGS. 9a, 9b, and 9c show examples where a three-level wavelet transform is applied and the output clusters after each transform are presented. At scale 1 we have the four fine clusters, and at the next scale two of those clusters are merged. At scale 3, we have only two coarse clusters representing original feature space. In our approach, a user does not have to know the exact number of clusters. However, a good estimation of number of clusters helps in choosing the appropriate scale and the corresponding clusters. One of the effects of applying low pass filter on the feature space is the removal of noise. WaveCluster takes advantage of this property, and removes the noise from the feature space automatically. FIG. 3-a shows an example where about 25,000 noise objects are scattered in the feature space. After applying wavelet transform, the noise objects are removed and thus WaveCluster can detect the clusters correctly. i 5.3 Time Complexity Let N be the number of objects in the database, where N is a very large number. Assume the feature vectors of objects are d-dimensional, resulting in a d-dimensional feature space. As we mentioned in Section 2, the current version of WaveCluster is designed for the cases where N is very large and d is low. The time complexity of the first step of WaveCluster algorithm is O(N), because it scans all the database objects and assigns them to the corresponding cells. Assuming m cells in each dimension of feature space, there would be $K=m^d$ cells. Complexity of applying wavelet transform on the quantized feature space (step 2) will be O(ldK)=O(dK), where l is a small constant representing the length of filter used in the wavelet transform. Since we assume that the value of d is low, we can consider it as a constant, thus O(dK)=O(K). If we apply wavelet transform for T levels of decomposition, since for each level, we down sample the space by two, for $d \geq 2$, the required time would be $$O\left(K + \frac{K}{2^d} + \frac{K}{(2^d)^2} + \ldots + \frac{K}{(2^d)^T}\right) \equiv O\left(K \sum_{i=0}^{T} \frac{1}{(2^d)^i}\right) =$$

$$O\left(K \sum_{i=0}^{T} (2^{-d})^i\right) = O\left(K \frac{1 - (2^{-d})^{T+1}}{1 - 2^{-d}}\right) \leq O\left(\frac{4}{3} K\right)$$

That means the cost to apply wavelet transform for multiple levels would be at most $$O\frac{4}{3}K.$$

Thus, we have multiresolution presentation of the clusters very cost-effectively. To find the connected components in the transformed feature space, the required time will be $O(cK)=O(K)$, where c is a small constant. Making the lookup table requires $O(K)$ time. After reading data objects, the processing of data is performed is steps 2 to 5 of the algorithm. Thus the time complexity of processing data (without considering I/O) would in fact be $O(K)$, which is independent of number of data objects (N). The time complexity of the last step of WaveCluster algorithm is $O(N)$. Since this algorithm is applied on very large databases with low number of dimensions, we can assume that $N \geq K$. As an example, for a database with 1,000,000 objects when the number of dimensions d is less than or equal to 6, and the number of intervals m is 10, this condition holds. Thus based on this assumption the overall time complexity of the algorithm will be $O(N)$. It should be noted that because of the way that we find the connected components (and hence the clusters), the number of clusters does not affect the time complexity of WaveCluster. In other words, WaveCluster's time complexity is independent of the number of clusters.

While applying the wavelet transform on each dimension of the feature space, the required operations for each feature space cell can be carried out independently of the other cells. Thus, parallel processing can speed up transforming the feature space. The connected component analysis can also be speeded up using parallel processing [NS80, SV82]. Parallel processing algorithms will be especially useful when the number of cells m or the number of dimensions d is high. For a large number of dimensions we may have $N<K=m^d$. For such cases, we can also perform principle component analysis [Sch92], to find the most important features and to reduce the number of dimensions to a value of f such that $N>m^f$. We have provided another solution using a hash-based data structure for the cases when number of dimensions is high which is presented in [YCSZ98].

6 Performance Evaluation

In this section, we evaluate the performance of Wave-Cluster and demonstrate it's effectiveness on different types of distributions of data. Tests were done on synthetic datasets generated by us and also on datasets used to evaluate BIRCH [ZRL96]. We mainly compare our clustering results with BIRCH.

Synthetic Dataset Generation

For the experiments we used the datasets generated by both our own synthetic generator and the ones used by [ZRL96]. In the dataset generation method described in [ZRL96] cluster centers are first placed at certain locations in the space. The data points of each cluster are generated according to a 2-D normal distribution whose mean is the center and whose variance is specified. Datasets DS1, DS2 and DS3 are the same as used by [ZRL96]. They are shown in FIGS. 6-a, b, and c respectively. Each dataset consists of 100,000 points. The points in DS3 are randomly distributed while those of DS1 and DS2 are distributed in a grid and sine curve pattern respectively.

We designed our own synthetic dataset generator for performing further experiments The data generator allows control over the structure, number of clusters, probability distribution, and size of the data sets. It also allows us to add different proportion of noise to the generated datasets. We generated 14 new datasets to perform experiments.

We generated DS4 by spreading points in two-dimensional space following uniform random distribution in the shapes of rectangles and annular region. DS4 contains 228, 828 data objects spread in 2 clusters as shown in FIG. 6-d. For generating dataset DS5, we spread points around two parabolas following uniform random distribution. Dataset DS5 has 250,000 data objects, containing two concave clusters in the shape of parabolas.

Dataset DS6 was generated by spreading 275,429 random data objects following uniform distribution in two concentric annulus regions. We randomly generate two floating-point numbers in the feature space, one for each dimension. We then check whether the data object defined by these two features falls in the annular region defined by the inner radius, center and the width. The parameters used for generating this dataset are shown in Table 1. The parameter r is the radius of the void circle inside the annulus, w is the width of the annulus, and x and y define the location of the center of the annular.

TABLE 1

Parameters for generating DS6

| Parameters | r | w | x | Y |
|---|---|---|---|---|
| Inner Circle | 20.0 | 15.0 | 60.0 | 60.0 |
| Outer Circle | 40.0 | 20.0 | 60.0 | 60.0 |

We used a technique similar to one described in [ZRL96] to generate the dataset DS7. Two cluster centers are first placed on the two dimensional plane and then 500,000 data objects are spread following 2-D normal distribution around these points. After that 75,000 (15%) random noise objects were added to the dataset, making the total number of data objects 575,000. For the 2-D normal distribution we used the polar method proposed by Box, Muller and Marsaglia as described in [Knu98]. The dataset is shown in FIG. 6-g. The parameters used for this are shown in Table 2, where $\mu_x$ and $\mu_y$ specify the mean in each dimension i.e., the location of the cluster center, $\sigma_x$ and $\sigma_y$ specify the variance in each dimension and $\rho$ specifies the correlation coefficient between the variables in each dimension.

TABLE 2

Parameters for generating DS7

| Parameters | $\mu_x$ | $\mu_y$ | $\sigma_x$ | $\sigma_y$ | $\rho$ |
|---|---|---|---|---|---|
| Cluster 1 | 125.0 | 55.0 | 60.0 | 13.0 | 0.7 |
| Cluster 2 | 125.0 | 120.0 | 50.0 | 30.0 | 0.5 |

Generation of dataset DS8 follows a combination of strategies used for generating DS6 and DS4. We create two concentric annular region, one filled circle and an "L-shaped" cluster. There are total 252,869 data objects in DS8.

We also had several other datasets to study certain characteristics of WaveCluster. One group of datasets was used to verify the sensitivity of processing time of WaveCluster with increasing number of clusters. To make a fair comparison we made the total number of data objects the same but varied the number of clusters in these datasets. Each dataset has 1,000,000 data objects and 20,000 noise objects. The number of clusters in these datasets range from 2 to 100. The clusters are either rectangles (following a uniform random distribution) or ellipsoids (following 2-D normal random distribution as described before). The results for these experiments are reported in Table 3. The generation of rectangular clusters follow closely the method described in [ZM97]. We also generated several noisy versions of DS7 dataset to verify the noise removal property of WaveCluster. We added different proportions (5%, 10%, 15%. 20%, 25%) of noise to the original DS7 dataset to create these datasets.

The number of objects in them are 525,000, 550,000, 575,000, 600,000, and 625,000 respectively. The visualizations of these datasets and WaveCluster's results on them are presented in FIGS. 10a and 10b.

Clustering Very Large Databases

All the datasets used in the experiments contain typically more than 100,000 data points. DS1, DS2 and DS3 each has 100,000 data points. WaveCluster can successfully handle arbitrarily large number of data points. FIG. 7 shows Wavecluster's performance on DS1. Here a map coloring algorithm has been used to color the clusters. Neighboring clusters have different colors. But non-neighboring clusters might be allocated the same color. In FIG. 3, we showed the clustering results for a dataset with more than 500,000 objects.

Clustering Arbitrary Shapes

As we mentioned earlier, spatial data mining methods should be capable of handling any arbitrary shaped clusters. FIG. 6-d presents the DS4 dataset. There are 2 arbitrary, shaped clusters in the original data. FIG. 8a illustrates Wavecluster clustering results on DS4. FIG. 8b illustrates BIRCH clustering results on DS4. This result emphasizes effectiveness of the methods which do not assume the shape of the clusters a priori.

Clustering at Different Resolutions

WaveCluster has the remarkable property that it can be used to cluster at different granularities according to user's requirement. FIGS. 9a, 9b, and 9c display the results of WaveCluster on DS8 (FIG. 6-h). At scale 1, we have the four fine clusters, and at the next scale two of those clusters are merged. At scale 3, we have only two coarse clusters representing original feature space. This illustrates how WaveCluster finds clusters at different degrees of detail. This property of WaveCluster provides the user with the flexibility to modify queries based on initial results.

Handling Noise Objects

WaveCluster is very effective in handling noise. The dataset presented in FIG. 3 has 500,000 objects in two clusters plus 25,000 (5%) noise objects. We generated new datasets from it where 50,000, 75,000, 100,000, and 125,000 (10%, 15%, 20%, and 25%) uniformly distributed noise objects were added to datasets. The FIG. 10a illustrates datasets with noise level from 10 percent to 25 percent by WaveCluster are shown in FIG. 10. FIG. 10b illustrates clusters resulting from the use of WaveClusters on noisy datasets shown in FIG. 10a. WaveCluster successfully removes all the random noise and produces the two intended clusters in all cases. Also, because the time complexity of the processing phase of WaveCluster is O(K) (where K is the number of grid cells), the time taken to find the clusters in the noisy version of the data is the same as the one without the noise.

Clustering Nested and Concave Patterns

WaveCluster can successfully cluster any complex pattern consisting of nested or concave clusters. From FIG. 6-f (DS6) and FIG. 11-a we see that WaveCluster's result is very accurate on nested clusters. FIG. 11-b shows BIRCH's result on the same dataset.

FIG. 6-g (DS5) shows an example of a concave shape data distribution. FIGS. 12-a and 12-b compare the clustering produced by WaveCluster and BIRCH. From these results, it is evident that WaveCluster is very powerful in handling any type of sophisticated patterns.

Comparing Different Number of Clusters

We generated 9 datasets each having 1,000,000 data objects and added 20,000 noise objects to them. These datasets have the same number of data objects (1,020,000), but have different number of clusters ranging from 2 to 100 clusters. Table 3 summarizes the required quantization and processing time for these datasets. We applied Cohen-Daubechies-Feauveau (2,2) wavelet transform and used 256×256 quantization in these experiments. As this table shows, the number of clusters has no effect on the timing requirements of WaveCluster. It verifies our discussion in Section 5.3 that WaveCluster's time complexity is independent of the number of clusters.

TABLE 3

Required time (in seconds) for different number of clusters with same number of points.

| | Number of Clusters | | | | | | | | |
|---|---|---|---|---|---|---|---|---|---|
| | 2 | 4 | 5 | 10 | 20 | 25 | 40 | 50 | 100 |
| Quantization Time | 49.1 | 49.1 | 54.7 | 50.9 | 52.0 | 52.0 | 51.7 | 52.0 | 54.1 |
| Processing Time | 2.1 | 2.1 | 2.1 | 2.2 | 2.15 | 2.3 | 2.1 | 2.1 | 2.2 |

Comparison of Timing Requirements

We now compare the timing requirements of WaveCluster, BIRCH, and CLARANS as shown in Tables 4 and 5. We ran BIRCH on all the datasets. CLARANS requires the information about all the database objects to be loaded into memory, and its run time is very large when there are large number of objects. Thus, we were unable to run it. Based on the comparison of BIRCH and CLARANS presented in [ZLR96], we estimated the performance of CLARANS. Running code for DBSCAN and STING were not available, thus we were not able to do experiments with it. We observe that on an average CLARANS is 22 times slower than BIRCH. We show the time requirements for quantization and processing separately for WaveCluster. All the experiments were carried out on a SUN SPARC workstation using 168 MHz UltraSparc CPU with SunOS operating system and 1024 MB memory. We applied Cohen-Daubechies-Feauveau (2,2) wavelet transform in the experiments reported in Table 5.

TABLE 4

Required time (in seconds) for different datasets using CLARANS and BIRCH.

| Dataset Number of Data | DS6 | DS5 | DS4 | DS1 | DS2 | DS3 |
|---|---|---|---|---|---|---|
| | 275,429 | 250,000 | 228,828 | 100,000 | 100,000 | 100,000 |
| CLARANS | 2378.2 | 2376.0 | 2085.6 | 1232.0 | 1093.0 | 1089.4 |
| BIRCH | 108.1 | 108.0 | 94.8 | 56.0 | 49.7 | 49.5 |

Table 5 shows the average quantization time required in WaveCluster. It also presents the processing time when different number of grid cells are used in quantization. The values of $m_1$ and $m_2$ specify the number of cells in horizontal and vertical dimensions respectively. The total required time to cluster using WaveCluster is the summation of processing and quantization time. We observe that WaveCluster outperforms BIRCH and CLARANS by a large margin when we use the finest quantization (512×1024) which takes the longest among other quantizations in our experiments. Even if we add up the processing time for all different quantizations, the total time would still be less than that of the other clustering methods.

TABLE 5

Required time (in seconds) for different datasets using WaveCluster.

|  |  | Dataset | | | | | |
|---|---|---|---|---|---|---|---|
|  |  | DS6 | DS5 | DS4 | DS1 | DS2 | DS3 |
|  |  | | | Number of data | | | |
| | $m_1$ $m_2$ | 275,429 | 250,000 | 228,828 | 100,000 | 100,000 | 100,000 |
| Processing | 512  1024 | 5.9 | 5.7 | 6.3 | 5.6 | 5.8 | 6.0 |
| Time | 512  512 | 3.5 | 3.5 | 3.4 | 3.8 | 3.4 | 3.3 |
| | 256  512 | 2.2 | 2.1 | 2.0 | 2.3 | 2.1 | 2.0 |
| | 256  256 | 1.4 | 1.5 | 1.5 | 1.5 | 1.4 | 1.4 |
| | 128  256 | 1.2 | 1.1 | 1.1 | 1.2 | 1.2 | 1.1 |
| | 128  128 | 0.9 | 1.0 | 1.0 | 1.0 | 0.9 | 1.0 |
| | 64  128 | 1.0 | 0.9 | 0.8 | 1.1 | 1.0 | 0.9 |
| | 64  64 | 0.9 | 0.9 | 0.9 | 0.9 | 0.9 | 0.8 |
| Quantization Time | | 11.7 | 11.0 | 9.7 | 5.4 | 5.6 | 5.5 |

The processing time of WaveCluster is almost independent of the distribution of the spatial objects and most importantly it is even independent of number of objects present in the space. As Table 5 shows, the time taken by WaveCluster is heavily dominated by the time to read the input data from the disk. A faster method to do I/O will make the algorithm a whole lot faster. The experimental results demonstrate WaveCluster to be a stable and efficient clustering method.

As Table 5 shows, the processing time (without considering I/O) is not a function of number of data objects. For datasets of different sizes, WaveCluster requires almost similar processing time (given the same quantization). As mentioned in Section 5.3, the time complexity of processing data in linear terms of number of the feature space cells (O(K)). The timing results shown in Table 5 verify this property of WaveCluster. When we have less number of cells (coarser quantization), the required time is less. Quantization time includes the time to read the input data and assign them to the cells and hence is a function of number of input data. That is, as shown in Table 5, the required quantization time for larger datasets is larger than that of smaller datasets.

Clustering at Different Quantizations

In Table 5 we showed how quantization affects the processing time and thus the overall efficiency of WaveCluster. We now present our experimental results regarding the effect of quantization on the quality of clustering. We performed experiments on the dataset DS1 that has 100 clusters. Table 6 shows the number of clusters found by WaveCluster where different quantizations were used. In Section 5.2, we discussed the problems of scaling, aggregation, under-quantization, and over-quantization. When we used the fine quantization 2048×4096, almost all the 100 were eliminated as noise (over-quantization). On the other hand, when the objects were quantized coarsely (under-quantization), (for example 32×64 or 64×128), most of the clusters were merged to each other yielding low quality results. When we used 256×512 quantization, almost all the 100 clusters were correctly detected and we obtained the best results. Table 6 shows that for 1024×2048 quantization, WaveCluster also detects about 100 clusters. However, due to over-quantization and because of low density of objects at the border of clusters, most of such border objects were not assigned to the clusters. Thus, for this case, the results were not satisfactory.

TABLE 6

Number of clusters found for DS1 using different quantizations.

| $m_1$ | 2048 | 1024 | 512 | 256 | 128 | 64 | 32 |
|---|---|---|---|---|---|---|---|
| $m_2$ | 4096 | 2048 | 1024 | 512 | 256 | 128 | 64 |
| Number of Clusters | 1 | 110 | 203 | 105 | 48 | 13 | 3 |

7 Conclusion

In this patent, we presented the clustering approach termed WaveCluster. This grid-based approach applies wavelet transform on the quantized feature space and then detects the dense regions in the transformed space. Applying wavelet transform makes the clusters more distinct and salient in the transformed space and thus ease their detection. Using multiresolution property of wavelet transform, WaveCluster can detect the clusters at different scales and levels of details which can be very useful in the user's applications. Moreover, applying wavelet transform removes the noise from the original feature space, and thus enables WaveCluster to handle them properly and find more accurate clusters. WaveCluster does not make any assumption about the shape of clusters and can successfully detect arbitrary shape clusters such as concave or nested clusters. It is a very efficient method with time complexity of O(N), where N is the number of objects in the database, which makes it specially attractive for very large databases. WaveCluster is insensitive to the order of input data to be processed. Current clustering techniques do not address these issues sufficiently, although considerable work has been done in addressing each issue separately. Our experimental results demonstrated that WaveCluster can outperform the other recent clustering approaches. WaveCluster is the first attempt to apply the properties of wavelet transform in the clustering problem in spatial data mining.

What we claim is:

1. A method of managing spatial data in a database, comprising:

a.) quantizing a feature space to determine cells of said feature space;

b.) assigning objects to said cells;

c.) applying a wavelet transform on the quantized feature space to obtain a transformed feature space;

d.) finding connected clusters in subbands of said transformed feature space, at different levels;
e.) assigning labels to said cells;
f.) creating a look-up table; and,
g.) mapping the objects to the clusters.

2. The method recited in claim 1 wherein said feature space is two-dimensional.

3. The method recited in claim 2 wherein said feature space is an image taken by a satellite.

* * * * *